US012647499B2

(12) United States Patent
Cheng et al.

(10) Patent No.: US 12,647,499 B2
(45) Date of Patent: Jun. 2, 2026

(54) FOLDABLE MECHANISM, BRACKET STRUCTURE, AND ELECTRONIC DEVICE

(71) Applicant: VIVO MOBILE COMMUNICATION CO., LTD., Dongguan (CN)

(72) Inventors: Dongcun Cheng, Dongguan (CN); Heng Zhang, Dongguan (CN); Fei Dong, Dongguan (CN); Jingwei Xu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 376 days.

(21) Appl. No.: 18/369,113

(22) Filed: Sep. 15, 2023

(65) Prior Publication Data

US 2024/0007553 A1 Jan. 4, 2024

Related U.S. Application Data

(63) Continuation of application No. PCT/CN2022/080887, filed on Mar. 15, 2022.

(30) Foreign Application Priority Data

Mar. 19, 2021 (CN) .......................... 202110298598.7

(51) Int. Cl.
| | |
|---|---|
| *G06F 1/16* | (2006.01) |
| *H04M 1/00* | (2006.01) |
| *H04M 1/02* | (2006.01) |

(52) U.S. Cl.
CPC .......... *H04M 1/022* (2013.01); *G06F 1/1616* (2013.01); *H04M 1/0268* (2013.01)

(58) Field of Classification Search
CPC ... H04M 1/022; H04M 1/0268; G06F 1/1616; G06F 1/1641; G06F 1/1652; G06F 1/1681
See application file for complete search history.

(56) References Cited

U.S. PATENT DOCUMENTS 8,971,032 B2 * 3/2015 Griffin ................... G06F 1/1616
                                                    361/679.01
10,474,196 B2 * 11/2019 Yeh ....................... G06F 1/1681
(Continued)

FOREIGN PATENT DOCUMENTS

CN        108055371 A        5/2018
CN        108322567 A        7/2018
(Continued)

OTHER PUBLICATIONS

Extended European Search Report issued in related European Application No. 22770487.1, mailed Jul. 25, 2024, 8 pages.
(Continued)

*Primary Examiner* — Rockshana D Chowdhury
(74) *Attorney, Agent, or Firm* — IPX PLLC

(57) ABSTRACT

The present application discloses a foldable mechanism, a bracket structure, and an electronic device. The foldable mechanism includes a first screen support plate, a second screen support plate, a third screen support plate, a first housing seat rotatably arranged on the first screen support plate, a second housing seat rotatably arranged on the second screen support plate, and a base. The first housing seat and the second housing seat are both rotatably connected with the base. In the unfolded state, first sides of the first screen support plate and the second screen support plate are located between second sides, the third screen support plate is located between the first screen support plate and the second screen support plate, first surfaces of the first screen support plate, the second screen support plate and the third screen support plate are arranged in a flush manner.

19 Claims, 6 Drawing Sheets

(56) References Cited

U.S. PATENT DOCUMENTS

| | | | | |
|---|---|---|---|---|
| 10,761,574 | B1 | 9/2020 | Hsu et al. | |
| 10,778,822 | B2 * | 9/2020 | Si | G06F 1/1652 |
| 11,003,209 | B2 * | 5/2021 | Seo | G06F 1/1652 |
| 11,009,061 | B2 * | 5/2021 | Chang | F16C 11/04 |
| 11,032,402 | B2 * | 6/2021 | Liu | H04M 1/0268 |
| 11,336,759 | B2 * | 5/2022 | Liao | H04M 1/022 |
| 11,395,424 | B2 * | 7/2022 | Nagai | H05K 5/0226 |
| 11,644,873 | B2 * | 5/2023 | Hsu | G06F 1/1681 |
| | | | | 361/679.27 |
| 11,812,569 | B2 * | 11/2023 | Liu | H05K 5/0226 |
| 12,306,671 | B2 * | 5/2025 | Caplow-Munro | G06F 1/1641 |
| 12,341,917 | B2 * | 6/2025 | Moon | G09F 9/301 |
| 12,349,298 | B2 * | 7/2025 | Zhang | H04M 1/022 |
| 12,353,256 | B2 * | 7/2025 | Wang | G06F 1/1656 |
| 12,368,792 | B2 * | 7/2025 | Gao | G06F 1/1652 |
| 12,379,749 | B2 * | 8/2025 | Liu | G06F 1/1681 |
| 2015/0185783 | A1 * | 7/2015 | Hui | G06F 1/1624 |
| | | | | 361/679.29 |
| 2019/0369668 | A1 * | 12/2019 | Kim | H10K 59/87 |
| 2020/0363843 | A1 | 11/2020 | Cheng | |
| 2021/0044682 | A1 | 2/2021 | Liu et al. | |
| 2021/0389809 | A1 * | 12/2021 | Choi | G06F 1/1647 |
| 2022/0171440 | A1 * | 6/2022 | Lee | G06F 1/1681 |
| 2022/0215815 | A1 * | 7/2022 | Kim | G09G 5/14 |
| 2022/0236774 | A1 * | 7/2022 | Kim | H05K 5/03 |
| 2023/0040036 | A1 * | 2/2023 | Lee | H04M 1/0277 |
| 2023/0337381 | A1 * | 10/2023 | Yun | G06F 1/1652 |
| 2024/0007553 | A1 * | 1/2024 | Cheng | H04M 1/0268 |
| 2024/0155791 | A1 * | 5/2024 | Lee | G06F 1/1616 |
| 2024/0251515 | A1 * | 7/2024 | Zhan | F16C 11/04 |

FOREIGN PATENT DOCUMENTS

| | | |
|---|---|---|
| CN | 109658826 A | 4/2019 |
| CN | 111583791 A | 8/2020 |
| CN | 112466212 A | 3/2021 |
| CN | 113067926 A | 7/2021 |
| EP | 3876504 A1 | 9/2021 |
| IN | 112081815 A | 12/2020 |
| WO | 2020186889 A1 | 9/2020 |

OTHER PUBLICATIONS

International Search Report issued in corresponding International Application No. PCT/CN2022/080887, mailed Jun. 7, 2022, 4 pages.

First Office Action issued in related Chinese Application No. 202110298598.7, mailed Dec. 2, 2022, 6 pages.

Second Office Action issued in related Chinese Application No. 202110298598.7, mailed Aug. 5, 2023, 9 pages.

* cited by examiner

FOLDABLE MECHANISM, BRACKET STRUCTURE, AND ELECTRONIC DEVICE

CROSS-REFERENCE TO RELATED APPLICATIONS

This application is a continuation of International Application No. PCT/CN2022/080887, filed Mar. 15, 2022, which claims priority to Chinese Patent Application No. 202110298598.7, filed Mar. 19, 2021. The entire contents of each of the above-referenced applications are expressly incorporated herein by reference.

TECHNICAL FIELD

The present application relates to the technical field of communication devices, and in particular relates to a foldable mechanism, a bracket structure, and an electronic device.

BACKGROUND

With the advancement of technologies, the styles of electronic devices such as mobile phones are becoming more and more diverse, such as the tablet type, the sliding cover type, and the foldable type. Foldable electronic devices have large display areas and high portability and other advantages, and therefore are more and more favored by consumers. Foldable electronic devices are generally divided into the outward-foldable type and the inward-foldable type, and the inward-foldable type can provide a better protection effect for the display screen and is adopted by more manufacturers. However, in the process of the display screen being folded inward, it is easy to form creases on the display screen, resulting in a short service life of the display screen.

SUMMARY

The present application discloses a foldable mechanism, a bracket structure, and an electronic device.

According to a first aspect, an embodiment of the present application discloses a foldable mechanism, which includes a first screen support plate, a second screen support plate, a third screen support plate, a first housing seat, a second housing seat, and a base, wherein:

the first housing seat is arranged on the first screen support plate, and the first screen support plate is rotatably matched with the first housing seat;

the second housing seat is arranged on the second screen support plate, and the second screen support plate is rotatably matched with the second housing seat;

the base is provided with a plurality of first rotating parts, and the first housing seat and the second housing seat are rotationally connected to the plurality of first rotating parts in a one-to-one correspondence through their respective second rotating parts;

the foldable mechanism has an unfolded state and a folded state, and in the unfolded state, respective first sides of the first screen support plate and the second screen support plate are located between respective second sides of the first screen support plate and the second screen support plate, the third screen support plate is located between the first screen support plate and the second screen support plate, and the first screen support plate, the second screen support plate, and the third screen support plate are arranged in a flush manner away from a first surface of the base; and in the folded state, a spacing between the respective first sides of the first screen support plate and the second screen support plate is greater than that of the respective second sides of the first screen support plate and the second screen support plate.

According to a second aspect, an embodiment of the present application discloses a bracket structure, which includes a first housing, a second housing, and the above-mentioned foldable mechanism; where the first housing seat is fixedly connected to the first housing, and a side of the first housing and a side of the first housing seat facing the first screen support plate are both provided with an inclined avoidance support surface;

the second housing seat is fixedly connected to the second housing, and a side of the second housing and a side of the second housing seat facing the second screen support plate are both provided with an inclined avoidance support surface; and in the folded state, the first screen support plate and the second screen support plate are respectively supported on the corresponding inclined avoidance support surfaces.

According to a third aspect, an embodiment of the present application discloses an electronic device, which includes a first display module and the above bracket structure, the first display module includes a flexible display screen, the first display module is arranged on the bracket structure, and the first display module can be supported by the first housing, the second housing, the first screen support plate, the second screen support plate, and the third screen support plate.

An embodiment of the present application provides a foldable mechanism, which includes a first screen support plate, a second screen support plate, a third screen support plate, a first housing seat, a second housing seat, and a base. The first screen support plate is rotatably connected with the first housing seat, the second screen support plate is rotatably connected with the second housing seat, the first housing seat and the second housing seat are both rotatably connected with the base, the first screen support plate and the second screen support plate can rotate relative to the first housing seat and the second housing seat, the first screen support plate can also rotate relative to the first housing seat, and the second screen support plate can also rotate relative to the second housing seat, so that the foldable mechanism switches between the folded state and the unfolded state. In the unfolded state, the respective first sides of the first screen support plate and the second screen support plate are located between the respective second sides of the first screen support plate and the second screen support plate, and the first screen support plate, the second screen support plate, and the third screen support plate are arranged in a flush manner away from a first surface of the base, thereby providing reliable support for the first display module of the electronic device, ensuring that the first display module can be in a flattened state, and providing users with a larger display area. In the folded state, the spacing between the respective first sides of the first screen support plate and the second screen support plate is greater than that between the respective second sides of the first screen support plate and the second screen support plate, so that the first screen support plate and the second screen support plate forms a flaring structure, and the flaring of the flaring structure faces the base. During the process of being folded with the foldable mechanism, the middle part of the first display module is accommodated by the flaring structure formed by the first screen support plate and the second screen support plate, so that the folding degree of the middle part of the first display module can be relatively small, so that creases can be prevented from forming on the display screen such as the first display module as much as possible, to improve the service life of the display screen. Moreover, during the usage of the electronic device using the above foldable mechanism, the overall size of the electronic device in the folded state is relatively small, and the degree of portability is relatively high, which is convenient for users to carry. In addition, by setting the third screen support plate, gaps between the first screen support plate and the third screen support plate, and between the second screen support plate and the third screen support plate are relatively smaller, and the spacings between the first screen support plate and the second screen support plate and the base can be reduced to a certain extent in the foldable mechanism in the unfolded state, so that the thickness of the foldable mechanism is reduced, and the thickness of the electronic device using the foldable mechanism is reduced. At the same time, the base and the first display module of the electronic device can be separated by means of the third screen support plate, thereby preventing damage to the first display module and improving the service life of the first display module.

BRIEF DESCRIPTION OF DRAWINGS

The accompanying drawings described herein are intended to provide a further understanding of the present application, and constitute a part of the present application. Example embodiments of the present application and descriptions thereof are intended to describe the present application, and do not constitute limitations on the present application. In the accompanying drawings.

DETAILED DESCRIPTION

To make the objectives, technical solutions, and advantages of the present application clearer, the following describes the technical solutions of the present application with reference to the embodiments of the present application and the corresponding accompanying drawings. Apparently, the described embodiments are merely some rather than all of embodiments of the present application. All other embodiments obtained by a person of ordinary skill in the art based on embodiments of the present application without creative efforts shall fall within the protection scope of the present application.

The technical solutions disclosed in embodiments of the present application are described in detail below with reference to the accompanying drawings.

As shown in FIG. 1 to FIG. 7, the embodiment of the present application discloses a foldable mechanism, a bracket structure, and an electronic device. The electronic device may be a foldable electronic device, the electronic device may include a first display module 610 and the above-mentioned bracket structure, and the bracket structure may include a first housing 110, a second housing 120, and the above-mentioned foldable mechanism. By using the above-mentioned foldable mechanism, the electronic device can switch between the folded state and the unfolded state.

Figure 1:
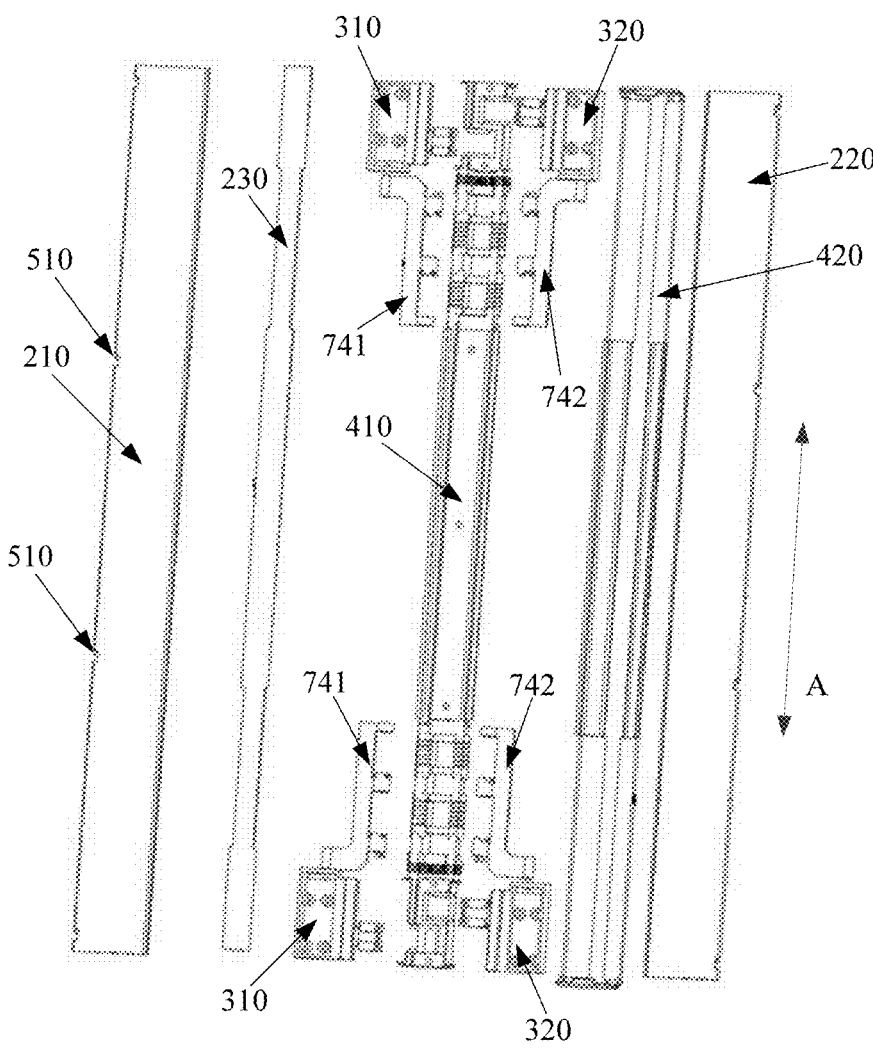
FIG. 1 is an exploded schematic view of a foldable mechanism provided by an embodiment of the present application.
Figure 2:
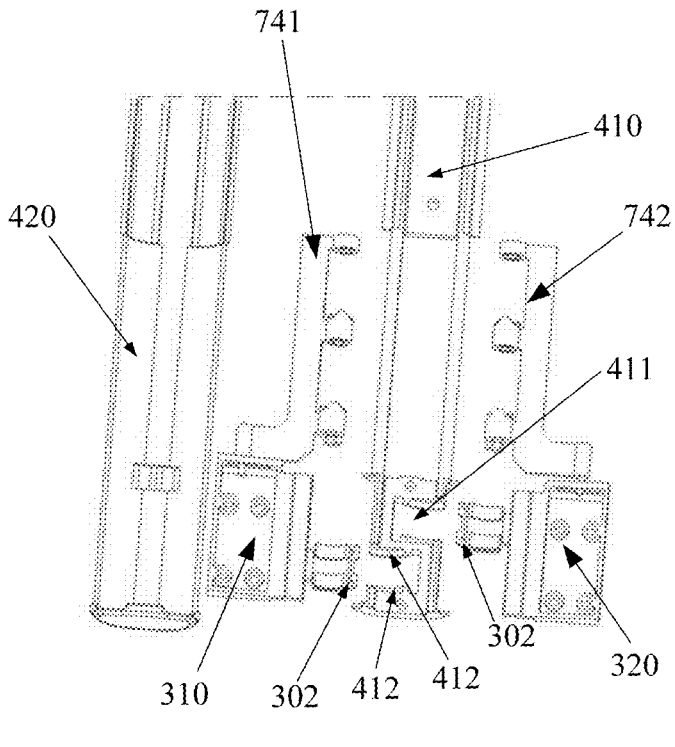
FIG. 2 is an enlarged view of a partial structure of a foldable mechanism including a base provided by an embodiment of the present application.

As shown in FIG. 1 and FIG. 2, a foldable mechanism provided by an embodiment of the present application includes a first screen support plate 210, a second screen support plate 220, a third screen support plate 230, a first housing seat 310, a second housing seat 320, and a base 410. In order to improve the symmetry of the foldable mechanism and improve the folding performance of the entire foldable mechanism, the structures of the first screen support plate 210 and the second screen support plate 220 can be arranged symmetrically, and are respectively arranged on opposite sides of the base 410. The third screen support plate 230 is arranged between the first screen support plate 210 and the second screen support plate 220; correspondingly, the structures of the first housing seat 310 and the second housing seat 320 are arranged symmetrically, and the first rotating part 412 matched with the first housing seat 310 on the base 410 and the first rotating part 412 matched with the second housing seat 320 on the base 410 are also arranged symmetrically.

The base 410 is a basic structural part of the foldable mechanism, and the base 410 can provide an installation basis for other components of the foldable mechanism, so that other components of the foldable mechanism can be directly or indirectly installed based on the base 410. In some embodiments, the base 410 is a thin plate to reduce the occupied space. In some embodiments, the base 410 may be a metal plate, and the metal plate can enable the base 410 to have sufficient strength even with a small thickness, so as not to affect the supporting performance of the base 410.

The base 410 is provided with a plurality of first rotating parts 412, the first housing seat 310 and the second housing seat 320 both include a second rotating part 302, and the plurality of second rotating parts 302 can be matched with the plurality of first rotating parts 412 in a one-to-one correspondence, so that both the first housing seat 310 and the second housing seat 320 can form a stable rotational fit relationship with the base 410, and it can ensure that the first housing seat 310 and the second housing seat 320 can be connected as a whole through the base 410.

In some embodiments, the number of first rotating parts 412 can be two, one of the two first rotating parts 412 is matched with the second rotating part 302 of the first housing seat 310, and the other first rotating part 412 is matched with the second rotating part 302 of the second housing seat 320. In this case, the two second rotating parts 302 can be symmetrically arranged on the base part 410 to ensure that the foldable mechanism has better folding performance. Of course, in the case that there are the plurality of first rotating parts 412 that are fitted with the first casing seat 310, the plurality of second rotating parts 302 can be arranged at intervals along the axial direction of the base 410, that is, the rotation axial direction of the second rotating part 302. Correspondingly, there can also be a plurality of second rotating parts 302 fitted with the second casing seat 320. By adopting the above technical solution, the reliability of the connection relationship and the rotational fit relationship between the first housing seat 310 and the second housing seat 320 can be further improved. The rotation axial direction of the second rotating part 302 may be the direction A in FIG. 1.

The first rotating part 412 and the second rotating part 302 are rotating structural parts that are fitted with each other, for example, may be shaft-hole matching structures. In another embodiment of the present application, one of the first rotating part 412 and the second rotating part 302 may be an arc-shaped groove structure, and the other may be an arc-shaped block structure. In this case, the stability of the rotational fit relationship between the first rotating part 412 and the second rotating part 302 can be improved to a certain extent. Moreover, the base 410 may be an arc-shaped structural part, so as to provide a better formation foundation for the first rotating part 412 and reduce the overall size of the base 410.

As shown in FIG. 1, combined with FIG. 4 to FIG. 7, the first housing seat 310 is arranged on the first screen support plate 210, and the first screen support plate 210 is rotatably matched with the first housing seat 310. The second housing seat 320 is disposed on the second screen support plate 220, and the second screen support plate 220 is rotatably matched with the second housing seat 320. When the foldable mechanism is applied to an electronic device, both the first screen support plate 210 and the second screen support plate 220 can provide support for the first display module 610. In order to prevent the existence of the first housing seat 310 and the second housing seat 320 from affecting the supporting effect of the first display module 610, the first housing seat 310 is arranged on a side of the first screen support plate 210 away from the first display module 610. Correspondingly, the second housing seat 320 is disposed on a side of the second screen support plate 220 away from the first display module 610. In some embodiments, a rotational fit relationship may be formed between the first housing seat 310 and the first screen support plate 210, and between the second housing seat 320 and the second screen support plate 220 through rotational structural parts such as shaft holes. In addition, a maximum relative rotation angle between the first screen support plate 210 and the first housing seat 310 can be equal to a maximum relative rotation angle between the second screen support plate 220 and the second housing seat 320, so that the symmetry of the entire foldable mechanism is better, and the overall performance of the foldable mechanism is improved.

In some embodiments, the third screen support plate 230 can be fixed on the base 410, and in this case, the third screen support plate 230 will not rotate relative to the base 410 with the rotation of the first casing base 310 and other components. In a process of switching the foldable mechanism from the unfolded state to the folded state, the third screen support plate 230 can provide a certain insulation effect for the first display module 610 in the electronic device, preventing the first display module 610 from contacting or even pressing against the base 410 and the like, so as to ensure that the first display module 610 has a longer service life.

The foldable mechanism has an unfolded state and a folded state, and the entire foldable mechanism can be switched between the folded state and the unfolded state by making the first housing seat 310 and the second housing seat 320 move relative to each other based on the base 410. Moreover, during the state switching process of the foldable mechanism, both the first screen support plate 210 and the second screen support plate 220 move relative to the base 410, and in addition, as shown in FIG. 6 and FIG. 7, relative movement also occurs between the first screen support plate 210 and the first housing seat 310 and between the second screen support plate 220 and the second housing seat 320.

The first screen support plate 210 and the second screen support plate 220 both have a first side 203 and a second side arranged opposite to each other, the first screen support plate 210 and the second screen support plate 220 have a first surface 201 and a second surface 202 arranged opposite to each other, the first surfaces 201 of the first screen support plate 210 and the second screen support plate 220 are disposed away from the base 410, that is, the first screen support plate 210 and the second screen support plate 220 are both arranged on the same side of the base 410, each first surface 201 is used as a screen support surface to support the first display module 610 or the like, and the second surfaces 202 of the first screen support plate 210 and the second screen support plate 220 arranged opposite to the first surfaces are arranged towards the base 410.

Figure 6:
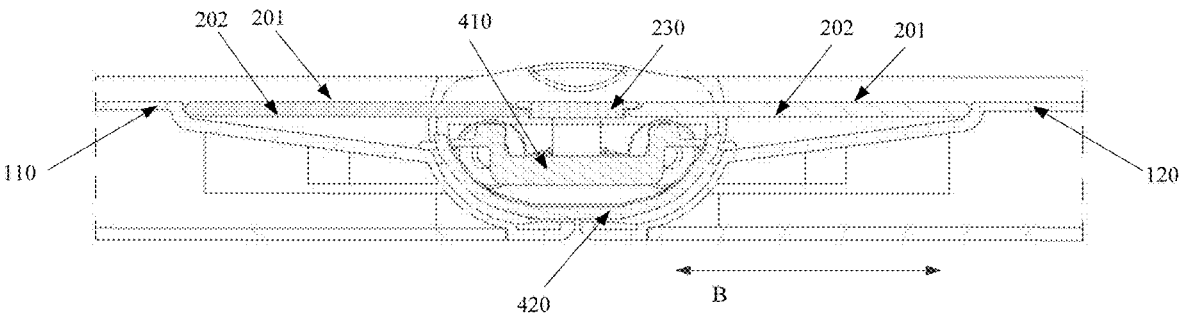
FIG. 6 is a schematic cross-sectional view of an electronic device in an unfolded state provided by an embodiment of the present application.

As shown in FIG. 6, in the unfolded state, the respective first sides 203 of the first screen support plate 210 and the second screen support plate 220 are located between the respective second sides, and the first screen support plate 210, the second screen support plate 220, and the third screen support plate 230 are respectively arranged in a flush manner away from the first surface 201 of the base 410.

Figure 7:
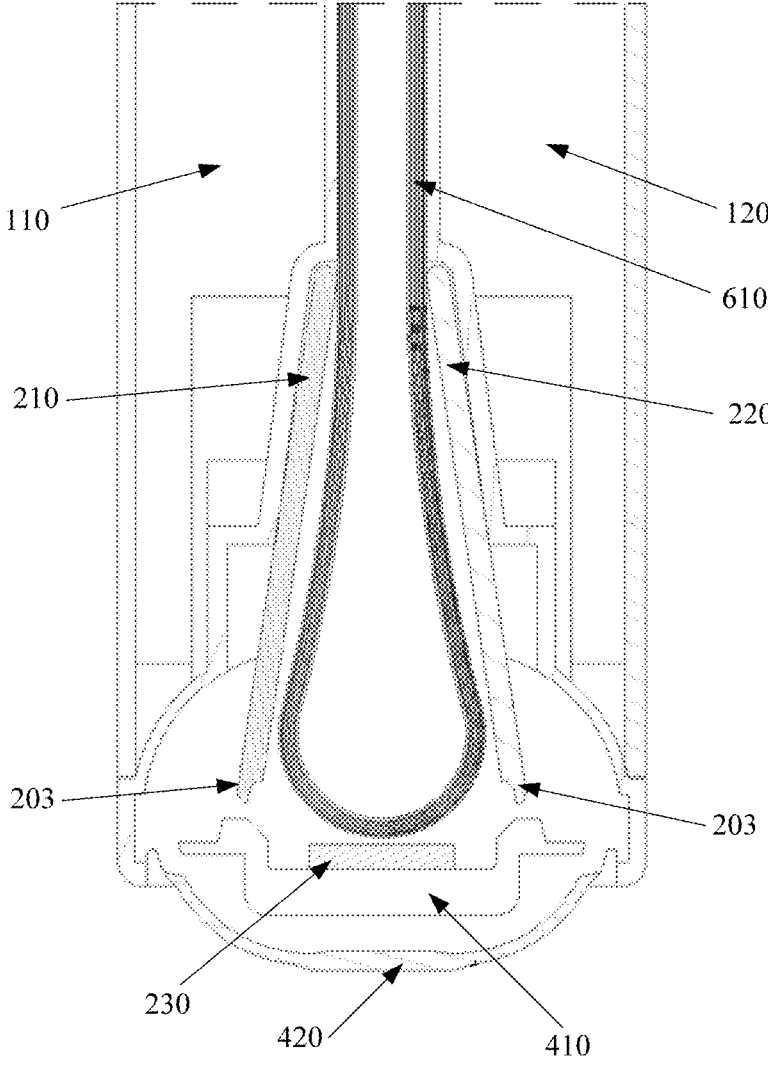
FIG. 7 is a schematic cross-sectional view of an electronic device in a folded state provided by an embodiment of the present application.

As shown in FIG. 7, in the folded state, a spacing between the respective first sides 203 of the first screen support plate 210 and the second screen support plate 220 is greater than that of the respective second sides of the first screen support plate 210 and the second screen support plate 220.

In detail, in the unfolded state, the first screen support plate 210, the second screen support plate 220 and the third screen support plate 230 are arranged in a flush manner, so that all three can provide support for the first display module 610, to ensure that the first display module 610 can stably maintain the flattened state. As shown in FIG. 6 and FIG. 7, during the process of switching the foldable mechanism from the unfolded state to the folded state, the relative rotation angle of the first screen support plate 210 and the second screen support plate 220 is greater than 180°, ensuring that in the folded state, a spacing between the respective first sides 203 of the first screen support plate 210 and the second screen support plate 220 is greater than that between the respective second sides of the first screen support plate and the second screen support plate.

In addition, as mentioned above, the foldable mechanism can be applied in the bracket structure. When the bracket structure is folded to the folded state with the foldable mechanism, as shown in FIG. 7, the first housing 110 and the second housing 120 are stacked, and respective screen supporting surfaces of the first housing 110 and the second housing 120 are arranged in parallel to ensure that the two parts of the first display module 610 supported by the first housing 110 and the second housing 120 can also be parallel to each other. In the process of assembling the first screen support plate 210 and the first housing seat 310, the rotating connection structure (the rotating component mentioned below) between the first screen support plate 210 and the first housing seat 310 can be arranged at the position where the first screen support plate 210 is close to its first side 203. In some embodiments, as shown in FIG. 1, the first screen support plate 210 can be rotatably connected to the first housing 110 away from the second side of the second screen support plate 220, so that when the first screen support plate 210 and the first housing seat 310 rotate relative to each other, the first screen support plate 210 can basically take the second side as the axis, avoiding that while the first side 203 of the screen support plate 210 rotates toward the first housing seat 310, the second side of the first screen support plate 210 rotates away from the first housing seat 310, to ensure that the first screen support plate 210 can always provide a better support effect for the first display module 610 and other components.

Based on the above, as shown in FIG. 7, the spacing between the respective second sides of the first screen support plate 210 and the second screen support plate 220 is equal to or substantially equal to the spacing between the respective screen supporting surfaces of the first housing 110 and the second housing 120 in the support structure in the folded state. Therefore, it can also be considered that in the folded state, the spacing between the respective first sides 203 of the first screen support plate 210 and the second screen support plate 220 is greater than the spacing between the first housing 110 and the second housing 120.

In some embodiments, according to parameters such as the widths of the first screen support plate 210 and the second screen support plate 220, the specific value of the spacing between the respective first sides 203 of the first screen support plate 210 and the second screen support plate 220 in the foldable mechanism in the folded state can be determined, and the width is a direction perpendicular to the rotational axis of the second rotating part 302 and may be the direction B in FIG. 6.

It should be noted that, in order to ensure that the relative rotation angle between the first screen support plate 210 and the second screen support plate 220 can exceed 180°, it is necessary to ensure that the first screen support plate 210 can move relative to the first housing seat 310, and it is necessary to ensure that the second screen support plate 220 can move relative to the second housing seat 320. In some embodiments, in order to achieve the purpose, parameters such as specific structures and/or installation positions of components such as the base 410, the first housing seat 310, and the second housing seat 320 may be restricted.

Taking the first screen support plate 210 as an example, in the unfolded state, as shown in FIG. 6, it is necessary to ensure that the first screen support plate 210 is spaced from components such as the first housing seat 310, the base 410, and the first housing 110, in order to provide avoidance space for the first screen support plate 210 to rotate towards the first housing seat 310. Similarly, the process of designing and arranging components such as the second housing seat 320, the base 410 and the second housing 120 corresponding to the second screen support plate 220 is also the same.

An embodiment of the present application provides a foldable mechanism, which includes a first screen support plate 210, a second screen support plate 220, a third screen support plate 230, a first housing seat 310, a second housing seat 320, and a base 410. The first screen support plate 210 is rotatably connected with the first housing seat 310, the second screen support plate 220 is rotatably connected with the second housing seat 320, the first housing seat 310 and the second housing seat 320 are both rotatably connected with the base 410, the first screen support plate 210 and the second screen support plate 220 can rotate relative to the first housing seat 310 and the second housing seat 320, the first screen support plate 210 can also rotate relative to the first housing seat 310, and the second screen support plate 220 can also rotate relative to the second housing seat 320, so that the foldable mechanism switches between the folded state and the unfolded state. In the unfolded state, the respective first sides 203 of the first screen support plate 210 and the second screen support plate 220 are located between the respective second sides of the first screen support plate and the second screen support plate, and the first screen support plate 210, the second screen support plate 220, and the third screen support plate 230 are arranged in a flush manner away from a first surface 201 of the base 410, thereby providing reliable support for the first display module 610 of the electronic device, ensuring that the first display module 610 can be in a flattened state, and providing users with a larger display area. In the folded state, the spacing between the respective first sides 203 of the first screen support plate 210 and the second screen support plate 220 is greater than that between the respective second sides of the first screen support plate and the second screen support plate, so that the first screen support plate 210 and the second screen support plate 220 forms a flaring structure, and the flaring of the flaring structure faces the base 410. During the process of being folded with the foldable mechanism, the middle part of the first display module 610 is accommodated by the flaring structure formed by the first screen support plate 210 and the second screen support plate 220, so that the folding degree of the middle part of the first display module 610 can be relatively small, so that creases can be prevented from forming on the display screen such as the first display module 610 as much as possible, to improve the service life of the display screen. Moreover, during the usage of the electronic device using the above foldable mechanism, the overall size of the electronic device in the folded state is relatively small, and the degree of portability is relatively high, which is convenient for users to carry. In addition, by setting the third screen support plate 230, gaps between the first screen support plate 210 and the third screen support plate 230, and between the second screen support plate 220 and the third screen support plate 230 are relatively smaller, and the spacings between the first screen support plate 210 and the second screen support plate 220 and the base 410 can be reduced to a certain extent in the foldable mechanism in the unfolded state, so that the thickness of the foldable mechanism is reduced, and the thickness of the electronic device using the foldable mechanism is reduced. At the same time, the base 410 and the first display module of the electronic device can be separated by means of the third screen support plate 230, thereby preventing damage to the first display module and improving the service life of the first display module.

As mentioned above, the third screen support plate 230 can be fixed on the base 410. In another embodiment of the present application, the third screen support plate 230 can be movably connected to the base 410 along its own thickness direction. In some embodiments, the third screen support plate 230 can be movably installed on the base 410 through pins, so that the third screen support plate 230 can move relative to the base 410 during the working process of the foldable mechanism.

Based on the above, in the unfolded state, the spacing between the third screen support plate 230 and the base 410 along the thickness direction of the third screen support plate is the first spacing. In the folded state, the spacing between the third screen support plate 230 and the base 410 along the thickness direction of the third screen support plate is a second spacing, and the second spacing is smaller than the first spacing. Generally, when the foldable mechanism switches from the unfolded state to the folded state, the third screen support plate 230 moves toward the base 410. When the foldable mechanism switches from the folded state to the unfolded state, the third screen support plate 230 moves away from the base 410. By adopting the above technical solution, the accommodating space of the foldable mechanism in the folded state can be further enlarged, thereby further preventing the problem of creases caused by the first display module being folded.

In addition, an elastic part or the like can be provided between the third screen support plate 230 and the base 410, so that when the first display module is folded, the first display module can press the third screen support plate 230 to move toward the base 410, and in the process of gradually flattening the first display module, the elastic part can drive the third screen support plate 230 to reset through its own elastic force. In some embodiments, a power driver can also be provided between the third screen support plate 230 and the base 410, and the power driver can drive the third screen support plate 230 and the base 410 to move toward or away from each other.

Further, in the unfolded state, the third screen support plate 230 is supported on at least one of the first housing seat 310 and the second housing seat 320, and in the folded state, the third screen support plate 230 is supported on the base 410. That is, in the process in which the first housing seat 310 and the second housing seat 320 rotate relative to the base 410 and the foldable mechanism is in the unfolded state, the first housing seat 310 and the second housing seat 320 can interfere with the third screen support plate 230 mutually, thereby driving the third screen support plate 230 to move away from the base 410. Correspondingly, in the process of switching the foldable mechanism to the folded state, both the first housing seat 310 and the second housing seat 320 can withdraw from a side of the third screen support plate 230 facing the base 410, so that the third screen support plate 230 moves toward the base 410 and is finally supported on the base 410 to provide a reliable partition for the first display module.

In addition, as mentioned above, when the first screen support plate 210 rotates with the first housing seat 310 relative to the base 410, relative rotation may also occur between the first screen support plate 210 and the first housing seat 310. In some embodiments, in the process in which the first screen support plate 210 rotates toward the first housing seat 310, the driving force can be increased by the flexible display screen in the electronic device, while in the process in which the first screen support plate 210 rotates away from the first housing seat 310, the first screen support plate 210 can be driven by means of an elastic restoring force by providing a structure such as an elastic part in the foldable mechanism, so that when the first housing seat 310 and the second housing seat 320 rotate to the unfolded state, the first screen support plate 210 can be flush with the screen support surface of the first housing 110 to jointly provide support for the flexible display screen. In another embodiment of the present application, a power drive device, such as a motor, can also be arranged between the first screen support plate 210 and the first housing 110, and the first screen support plate 210 and the first housing seat 310 can also be driven by the power drive device to rotate toward or away from each other. Of course, the spacing between the second housing seat 320 and the second screen support plate 220 can also be designed and produced with reference to any of the above technical solutions.

Based on the above embodiment, as shown in FIG. 6 and FIG. 7, a side of the first screen support plate 210 and a side of the second screen support plate 220 close to the third screen support plate 230 are both provided with a first bonding edge, two opposite sides of the third screen support plate 230 are both provided with a second bonding edge. In the unfolded state, each second bonding edge is bonded on the corresponding first bonding edge. In some embodiments, the shapes and sizes of the first bonding edge and the second bonding edge can be adapted to each other, and both the first bonding edge and the second bonding edge can be stepped structural members to enhance stability of bonding the third screen support plate 230 on the first screen support plate 210 and the second screen support plate 220.

In the case of adopting the above technical solution, in the unfolded state, the third screen support plate 230 may be bonded on the first screen support plate 210 and the second screen support plate 220. In this case, the first screen support plate 210 and the second screen support plate 220 can also provide driving force for the movement of the third screen support plate 230 relative to the base 410. In this way, with the movement of the foldable mechanism, when the first screen support plate 210 and the second screen support plate 220 can rotate automatically, there is no need to provide driving parts for the third screen support plate 230. On the one hand, the number of parts in the foldable mechanism can be reduced, and on the other hand, the assembly efficiency of the foldable mechanism can be improved and production costs are reduced.

Figure 3:
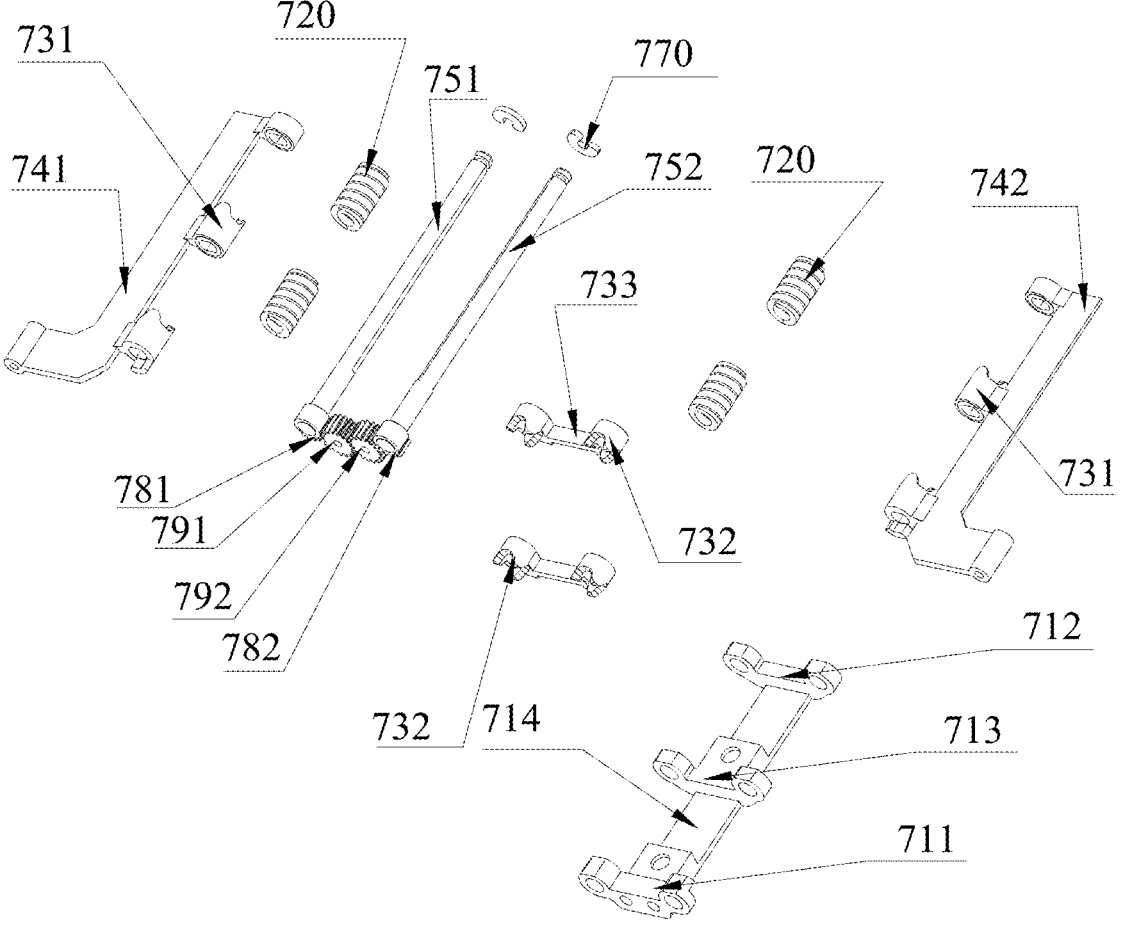
FIG. 3 is an exploded schematic diagram of a partial structure including a first synchronous swing arm in a foldable mechanism provided by an embodiment of the present application.
Figure 4:
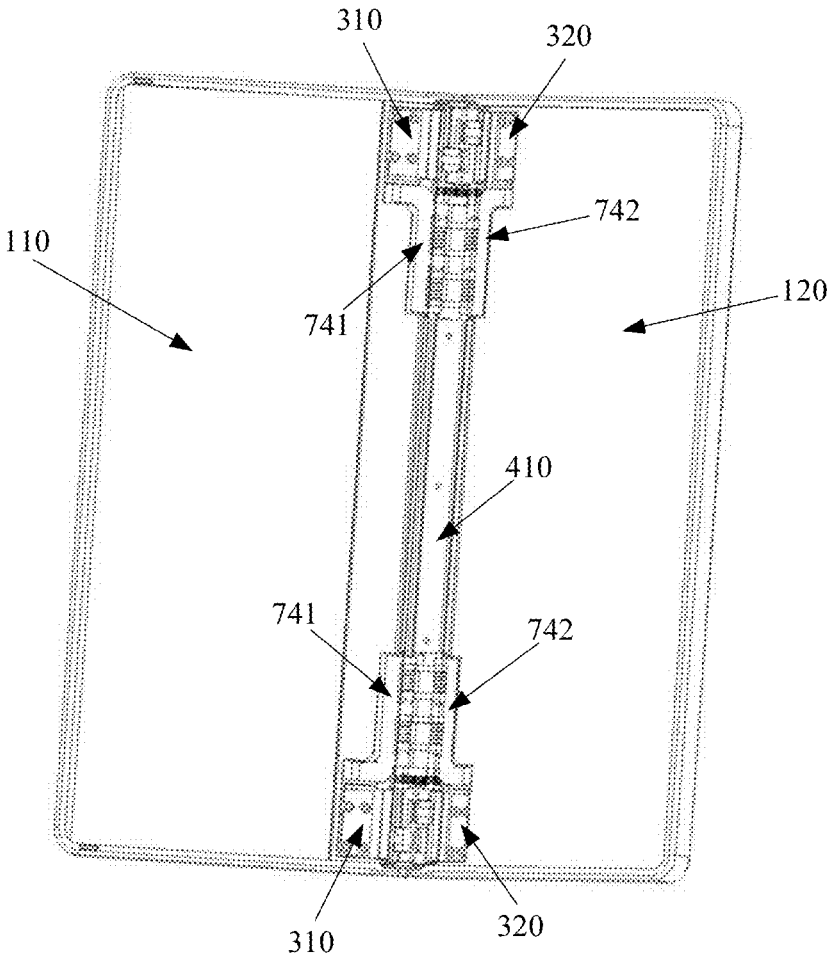
FIG. 4 is a schematic diagram of a partial structure of an electronic device provided by an embodiment of the present application.
Figure 5:
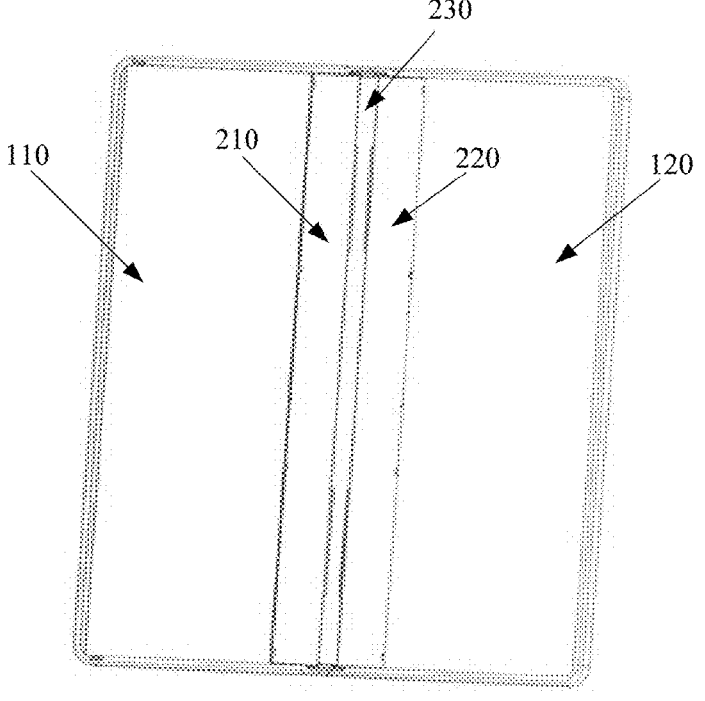
FIG. 5 is a schematic structural diagram of an electronic device provided by an embodiment of the present application.

In some embodiments, as shown in FIG. 1 and FIG. 3, the foldable mechanism provided in the embodiment of the present application may further include a first connecting shaft 751, a second connecting shaft 752, a first synchronous swing arm 741 and a second synchronous swing arm 742, the first synchronous swing arm 741 is fitted with the first connecting shaft 751 in a limiting manner in the rotation direction of the second rotating part 302, and the second synchronous swing arm 742 is fitted with the second connecting shaft 752 in a limiting manner in the rotating direction of the second rotating part 302. In some embodiments, both the first connecting shaft 751 and the second connecting shaft 752 can be rotatably connected to the base 410, the first synchronous swing arm 741 can be sleeved on the first connecting shaft 751, the second synchronous swing arm 742 can be sleeved on the second connecting shaft 752, and the above two groups of components can be correspondingly formed with an interference fit relationship. In another embodiment of the present application, the first synchronous swing arm 741 and the first connecting shaft 751 form a limiting fitting relationship through key joints, and correspondingly, the second synchronous swing arm 742 and the second connecting shaft 752 form a limiting fitting relationship through key joints, which can further improve the stability of the limiting fit relationship.

At the same time, the first synchronous swing arm 741 is fitted with the first housing seat 310, the second synchronous swing arm 742 is fitted with the second housing seat 320, the first synchronous swing arm 741 and the second synchronous swing arm 742 are connected through a gear synchronization mechanism, and the first housing seat 310 and the second housing seat 320 rotate synchronously through a gear synchronization mechanism. In the case of adopting the above-mentioned technical solution, it can be ensured that the first screen support plate 210 and the second screen support plate 220 have the ability to rotate synchronously, so that no matter which one of the two is driven, the other can be driven by the gear synchronization mechanism or the like to rotate relative to the base 410, to ensure that rotation angles of the first screen support plate 210 and the second screen support plate 220 relative to the base 410 are always the same, improving the overall performance of the entire foldable mechanism.

In some embodiments, the fit relationship between the first synchronous swing arm 741 and the first housing seat 310 can be determined according to actual parameters such as the directions of the rotational axes of the first connecting shaft 751 and the second rotating part 302. For example, when the axial direction of the first connecting shaft 751 coincides with the rotational axis of the first rotating part 412, the first synchronous swing arm 741 and the first housing seat 310 can be relatively fixed. In another embodiment of the present application, the rotational axis of the first connecting shaft 751 and the rotational axis of the second rotating part 302 may not coincide. In this case, it is necessary to make the first synchronous swing arm 741 and the first housing seat 310 move relative to each other.

In some embodiments, a slide slot can be provided on one of the first synchronous swing arm 741 and the first housing seat 310, a slide bar can be provided on the other, and the slide bar is fitted with the slide slot, so that even if the rotational axis of the first connecting shaft 751 does not coincide with the rotational axis of the second rotation part 302, it can also ensure that the first housing seat 310 can drive the first synchronous swing arm 741 to rotate relative to the base part 410. Furthermore, under the action of the gear synchronization mechanism, the second synchronous swing arm 742 can rotate correspondingly, and the second housing seat 320 is driven to rotate relative to the base 410, so that the first screen support plate 210 and the second screen support plate 220 can rotate synchronously.

In some embodiments, the gear synchronization mechanism includes a first meshing tooth 781 arranged on the first connecting shaft 751, a second meshing tooth 782 arranged on the second connecting shaft 752, a first gear 791 and a second gear 792, the first meshing tooth 781 meshes with the first gear 791, the first gear 791 meshes with the second gear 792, and the second gear 792 meshes with the second meshing tooth 782. When the above technical solution is adopted, relatively few components can be used to make the first housing seat 310 and the second housing seat 320 rotate synchronously.

In some embodiments, the first connecting shaft 751 and the first meshing tooth 781 can form a gear shaft, and correspondingly, the second connecting shaft 752 and the second meshing tooth 782 can also form a gear shaft. Besides, since the rotation angles of the first housing seat 310 and the second housing seat 320 relative to the base 410 are usually not greater than 180°, the first meshing tooth 781 can be made to cover a quarter turn to half a turn of the first connecting shaft 751, and correspondingly, the second meshing tooth 782 can be made to cover a quarter turn to a half turn of the second connecting shaft 752, which can basically ensure that the first meshing tooth 781 and the second meshing tooth 782 can provide reliable synchronization effect and can reduce production costs.

Further, the foldable mechanism may also include a first cam sleeve 731, a second cam sleeve 732, and an elastic part 720, the first connecting shaft 751 is sleeved with the first cam sleeve 731 and the second cam sleeve 732, the first synchronous swing arm 741 is fixed with the first cam sleeve 731, and the second cam sleeve 732 and the first connecting shaft 751 rotate in fitting with each other in the rotation direction of the second rotating part 302. When the first cam sleeve 731 and the second cam sleeve 732 rotate relative to each other, the elastic part 720 is in a stretched state or a compressed state.

In some embodiments, the specific structures of the first cam sleeve 731 and the second cam sleeve 732 can be the same, and the two are snapped together. During the relative rotation of the first cam sleeve 731 and the second cam sleeve 732, the maximum spacing between the first cam sleeve 731 and the second cam sleeve 732 is greater than the initial spacing between the two (that is, the minimum spacing). In this case, the elastic part 720 is stretched or compressed, so that the elastic part 720 can apply an elastic reset force to the first cam sleeve 731 and/or the second cam sleeve 732, to promote the recovery of the first cam sleeve 731 and the second cam sleeve 732 to the snapped state, that is, a state with the minimum spacing between the two.

By adopting the above-mentioned technical solution, the relative position between the first cam sleeve 731 and the second cam sleeve 732 in the snapped state can be designed, so that when the foldable mechanism is in the folded state and the unfolded state, the first cam sleeve 731 and the second cam sleeve 732 are both in the snapped state. In this way, as long as the foldable mechanism is no longer in the folded state or unfolded state, the relative rotation between the first cam sleeves 731 and the second cam sleeves 732 increases the spacing between the two, so that the elastic part 720 is stretched or compressed. Therefore, in the case of adopting the above technical solution, the foldable mechanism can be easily maintained in the unfolded state and the folded state by means of the elastic part 720, and this can prevent the unfolded state or the folded state of the foldable mechanism from being changed by a small external force and inconvenience to the user.

In some embodiments, the foldable mechanism further includes a mounting part 714, and the mounting part 714 is fixed on the base 410. In some embodiments, the mounting part 714 can be fixed on the base 410 by means of welding or connection with connecting parts. The mounting part 714 is provided with a first limiting part 711 and a second limiting part 712 that are opposite and fixed along the rotational axis of the second rotating part 302, the first cam sleeve 731, the second cam sleeve 732 and the elastic part 720 are all provided between the first limiting part 711 and the second limiting part 712, and the elastic part 720 is disposed on a side of the second cam sleeve away from the first cam sleeve. In the case of adopting the above technical solution, the first limiting part 711 and the second limiting part 712 can provide the positioning basis. On the one hand, the reliability of the elastic part 720 can be improved, and on the other hand, the elastic part 720 can also be mounted with less difficulty.

In the case of adopting the above-mentioned technical solution, when relative rotation occurs between the first cam sleeve 731 and the second cam sleeve 732, the elastic part 720 is compressed, so that the elastic part 720 applies, to the first cam sleeve 731 and the second cam sleeve 732, an elastic force that impels the two to reset. In order to further prevent the high difficulty in maintaining the folded state and the unfolded state of the foldable mechanism, the elastic part 720 can have a pre-tightening force, that is, in the state where the first cam sleeve 731 and the second cam sleeve 732 are snapped with each other, the elastic part 720 can also be in a compressed state.

In some embodiments, the first cam sleeve 731 and the first synchronous swing arm 741 can be formed by welding or integral molding, and the first synchronous swing arm 741 and the first connecting shaft 751 can form a limiting fit relationship through the first cam sleeve 731 in the rotation direction of the second rotating part 302. In some embodiments, the first cam sleeve 731 and the first connecting shaft 751 can be connected to each other through a key joint, and the inner peripheral surface of the second cam sleeve 732 can be a circular structural member to ensure that the second cam sleeve 732 can normally rotate relative to the first connecting shaft 751. Of course, in order to avoid that when the first connecting shaft 751 rotates with the first synchronous swing arm 741, the second cam sleeve 732 rotates together with the first connecting shaft 751 with the first cam sleeve 731, the second cam sleeve 732 is fitted with the base 410 in a limiting manner in the rotation direction of the second rotating part 302.

In addition, the first limiting part 711, the second limiting part 712 and the mounting part 714 can be integrally formed to improve the stability of the connection relationship among the three parts. Matching holes can be provided on the first limiting part 711 and the second limiting part 712, and two opposite ends of the first connecting shaft 751 and the second connecting shaft 752 are installed on the first limiting part 711 and the second limiting part 712 respectively. In some embodiments, the matching holes can all be through holes, and the first connecting shaft 751 and the second connecting shaft 752 can pass through the first limiting part 711 and the second limiting part 712. Afterwards, with the help of structures such as a snap ring 770, both the first connecting shaft 751 and the second connecting shaft 752 can form a stable rotational fit relationship with the mounting part 714. Moreover, the first gear 791 and the second gear 792 can also be rotatably mounted on the first limiting part 711 or the second limiting part 712 through a connecting shaft and the like, so that the first gear 791 and the second gear 792 can be in stable transmission fitting with the first meshing tooth 781 and the second meshing tooth 782.

In some embodiments, a third limiting part 713 is also provided on the mounting part 714, and the third limiting part 713 is located between the first limiting part 711 and the second limiting part 712. In some embodiments, the third limiting part 713 can also be integrally formed on the mounting part 714, and the third limiting part 713 can also be provided with a through hole for the first connecting shaft 751 and the second connecting shaft 752 to pass through. The first cam sleeve 731, the second cam sleeve 732 and the elastic part 720 are arranged between the first limiting part 711 and the third limiting part 713 and between the second limiting part 712 and the third limiting part 713. In the case of adopting the foregoing solution, the stability of the foldable mechanism to maintain the folded state and the unfolded state can be further improved. In some embodiments, the spacing between the first limiting part 711 and the third limiting part 713 and the spacing between the second limiting part 712 and the third limiting part 713 can be the same. In this case, parameters such as the structures of the first cam sleeves 731 can also be the same, parameters such as the structures of second cam sleeves 732 can also be the same, and parameters such as the structures of the elastic parts 720 can also be the same, thereby reducing spare parts and assembly difficulty.

In some embodiments, both the first synchronous swing arm 741 and the second synchronous swing arm 742 are fixed with a first cam sleeve 731, and each first cam sleeve 731 is equipped with a second cam sleeve 732 and an elastic part 720. That is, when the foldable mechanism is in the unfolded and folded states, both the side where the first synchronous swing arm 741 is located and the side where the second synchronous swing arm 742 is located can be elastically acted by the elastic part 720, and the elastic force can prevent the foldable mechanism from being separated from the unfolded state and the folded state, thereby improving the ability of the foldable mechanism to stably maintain the unfolded state and the folded state. Of course, both the first synchronous swing arm 741 and the second synchronous swing arm 742 can be provided with multiple sets of first cam sleeves 731, second cam sleeves 732 and elastic parts 720 that are fitted with each other, to further improve the ability of the foldable mechanism to stably maintain the unfolded state and the folded state.

As mentioned above, the second cam sleeve 732 and the base 410 and other components form a limiting relationship that meets the requirement, to avoid that the second cam sleeve 732 rotates with the first cam sleeve 731 when the first cam sleeve 731 rotates, and the first cam sleeve 731 and the second cam sleeve 732 cannot move axially. Based on the above embodiment, when the first synchronous swing arm 741 and the second synchronous swing arm 742 are equipped with the first cam sleeves 731, a connecting rod 733 may be provided between the second cam sleeves 732 that are fitted with the two first cam sleeves 731 respectively. In this case, on the one hand, the second cam sleeves 732 can be installed on the first connecting shaft 751 and the second connecting shaft 752 respectively to reduce the difficulty of assembly; on the other hand, this can also make the two second cam sleeves 732 capable of synchronous action and further improve the ability of the foldable mechanism to maintain the folded state and unfolded state. In addition, the two second cam sleeves 732 are connected through the connecting rod 733, so that during the design and assembly of the second cam sleeve 732, there is no need to separately configure a limiting structure for the second cam sleeve 732. Under the joint action of the connecting rod 733 and the two second cam sleeves 732, the second cam sleeve 732 can rotate respectively relative to the first connecting shaft 751 and the second connecting shaft 752, and this can basically ensure that the second cam sleeve 732 does not rotate as the first cam sleeve 731 rotates.

In some embodiments, as shown in FIG. 1 and FIG. 7, the foldable mechanism further includes a cover body 420, which is fixedly connected to a side of the base 410 away from the first screen support plate 210. The cover body 420 can provide protection for the base 410, and the foldable mechanism can be covered by the cover body 420, so that when the foldable mechanism is applied to an electronic device, the number of exposed parts of the electronic device can be reduced as much as possible. On the one hand, the appearance and performance of the electronic device can be improved, and on the other hand, the dustproof and waterproof performance of the electronic device can be improved, and the reliability of the electronic device can be improved. The cover body 420 can be fixed on the base 410 by bonding or other methods. In another embodiment of the present application, the base 410 and the cover body 420 can be detachably connected together by threaded connectors such as screws, to improve connection reliability between the two.

At the same time, in the folded state, the projection of the cover body 420 in a plane where distribution directions of the first screen support plate 210 and the second screen support plate 220 and the rotational axis direction of the second rotating part 302 are located covers the first housing seat 310, the second housing seat 320 and the base 410, to ensure that the cover body 420 has a good blocking effect. It should be noted that the distribution directions of the first screen support plate 210 and the second screen support plate 220 may be the direction B in FIG. 6.

In some embodiments, according to parameters such as specific structure and sizes of other components in the foldable mechanism, the structure, size, and installation position of the cover body 420 can be designed, so that in the folded state of the foldable mechanism, when the foldable mechanism is viewed from one side of the cover body 420, the first housing seat 310, the second housing seat 320 and the base 410 in the foldable mechanism can all be blocked by the cover body 420. In some embodiments, in order to improve the effect of blocking other components by the cover body 420, as shown in FIG. 7, the entire cover body 420 can be an arc-shaped structural member, which can also improve the connection tightness between the cover body 420 and the first housing 110 and the second housing 120 in the bracket structure, further improving the sealing performance of the bracket structure and the electronic device.

Further, as shown in FIG. 2, the first housing seat 310 and/or the second housing seat 320 includes an avoidance structure, and the avoidance structure is provided with an avoidance groove. In the unfolded state, sides of the cover body 420 are accommodated in the avoidance groove. In some embodiments, parameters such as the location and size of the avoidance groove can be flexibly determined according to parameters such as the extension position and thickness of the cover body 420, which are not limited herein.

In some embodiments, both the first housing seat 310 and the second housing seat 320 are provided with avoidance grooves. In this case, the avoidance grooves can provide an avoidance space for the sides of the cover body 420, so that sizes by which the two sides of the cover body 420 arranged opposite to each other along the direction B in FIG. 6 can extend toward the first screen support plate 210 and the second screen support plate 220 are larger, further improving the bending degree of the cover body 420. In this way, when the foldable mechanism is in the folded state, the gap between the cover body 420 and the first housing 110 and the second housing 120 can be smaller, thereby making the fitting among the three more reliable.

Taking the first housing seat 310 as an example, in the case that the first housing seat 310 is provided with an avoidance structure, in order to ensure that the structural strength of the first housing seat 310 can still meet the use requirements, as shown in FIG. 1, the position where the avoidance structure is located protrudes toward a side away from the avoidance groove. Based on the above situation, further, the first screen support plate 210 can be provided with an accommodation sinker, and in the folded state, at least a part of the avoidance structure is accommodated in the accommodation sinker, so as to avoid that since the avoidance structure is provided on the first housing seat 310, this adversely affects the maximum relative rotation angle between the first screen support plate 210 and the first housing seat 310.

In some embodiments, parameters such as the position, width and depth of the accommodation sinker can also be flexibly determined according to the actual parameters of the avoidance structure, which is not limited herein. In some embodiments, the second housing seat 320 can also be provided with a corresponding avoidance structure, and the second screen support plate 220 is also provided with a corresponding accommodation sinker, so as to improve the symmetry of the foldable mechanism and further improve the overall performance of the foldable mechanism.

In order to improve the structural compactness of the entire foldable mechanism, as shown in FIG. 1, the base 410 can be equipped with a receiving groove 411, and a first rotating part 412 is arranged inside the receiving groove 411.

Besides, at least a part of the second rotating part 302 of the first housing seat 310 and at least a part of the second rotating part 302 of the second housing seat 320 are accommodated in the receiving groove 411, which can reduce the space occupied by the foldable mechanism in the thickness direction of the base 410, thereby reducing the overall thickness of the electronic device and improving the overall performance of the product. It should be noted that the thickness direction of the base 410 may be a direction perpendicular to direction A in FIG. 1 and direction B in FIG. 6.

In some embodiments, by increasing the size of the receiving groove 411, a plurality of first rotating parts 412 can be arranged in one receiving groove 411. In another embodiment of the present application, in order to improve stability of the fitting between the first housing seat 310 and the second housing seat 320 and the base 410, and prevent the first housing seat 310 and the second housing seat 320 from interfering with each other, a plurality of first rotating parts 412 that may correspond to the receiving groove 411 are correspondingly provided. Of course, in order to ensure that at least a part of the second rotating part 302 accommodated in the receiving groove 411 can normally be fitted with the first rotating part 412, in the process of design and processing, specific structures of the first rotating part 412 and the second rotating part 302 can be adapted to parameters such as the structure and size of the receiving groove 411.

Further, in order to maximize the reliability of the rotational fit relationship between the first rotating part 412 and the second rotating part 302 located in the receiving groove 411, as shown in FIG. 1, one of the first rotating part 412 and the second rotating part 302 includes a slider, and the other is provided with a slide groove. The slide groove and the slider are slidably fitted. A fitting area between the slide groove and the slider is relatively large, and this can maximize the utilization of the space inside the receiving groove 411. In some embodiments, both the slide groove and the slider are arc-shaped structures, so as to ensure that both the first housing seat 310 and the second housing seat 320 can form a rotational fit relationship by means of the slide groove and the slider that are slidably fitted.

In order to further improve the stability of the rotational fit relationship between the first housing seat 310 and the second housing seat 320 and the base 410, as shown in FIG. 1, the first rotating part 412 is arranged on two opposite sides of the receiving groove 411. Correspondingly, the second rotating part 302 is provided on two opposite sides of the first housing seat 310 and the second housing seat 320. Taking the first housing seat 310 as an example, when the two second rotating parts 302 on two opposite sides of the first housing seat 310 are fitted with the two first rotating parts 412 in one receiving groove 411 in one-to-one correspondence, it can further prevent the first housing seat 310 from deviating from its own rotational axis and rotating relative to the base 410, thereby improving the stability of the rotational fit relationship between the first housing seat 310 and the base 410. Correspondingly, in the case of adopting the above technical solution, the rotational fit relationship between the second housing seat 320 and the base 410 is relatively more stable.

In the case that the first rotating part 412 is arranged in the receiving groove 411, in order to ensure a good rotational fit relationship between the first rotating part 412 and the second rotating part 302, the width of the base 410 should be reduced as much as possible (that is, the dimension of the base 410 along the direction B in FIG. 6). In some embodiments, a plurality of first rotating parts 412 may be arranged at intervals or in a staggered manner on the rotational axis of the second rotating part 302. That is, a plurality of first rotating parts 412 can be distributed along the rotating axis of the second rotating part 302, and any two adjacent first rotating parts 412 have a preset spacing between them. In some embodiments, in the case that a plurality of first rotating parts 412 are distributed along the rotational axis of the second rotating part 302, each two of the plurality of first rotating parts 412 can be formed into a group, and the two first rotating parts 412 in any group are adjacently arranged on the rotational axis of the second rotation part 302, that is, there is no spacing between the two first rotation parts 412 in the group on the rotational axis of the second rotation part 302. In this technical solution, on the one hand, the above-mentioned technical purpose can also be achieved; on the other hand, since the positions of the two first rotating parts 412 in the group are relatively close, by making the two first rotating parts 412 in any group correspondingly be fitted with the first housing seat 310 and the second housing seat 320, this can also improve the symmetry between the first housing seat 310 and the second housing seat 320 to a certain extent, thereby improving the overall performance of the foldable mechanism.

In order to improve the operation stability of the foldable mechanism, there are a plurality of first housing seats 310 and/or second housing seats 320. In some embodiments, the numbers of first housing seats 310 and second housing seats 320 are the same and there are both a plurality of the first housing seats and a plurality of the second housing seats. By providing a plurality of first housing seats 310 and a plurality of second housing seats 320 in groups, the action stability between the first housing 110 and the second housing 120 can be further improved.

Further, as mentioned above, the foldable mechanism can be applied in the bracket mechanism. Based on this, the embodiment of the present application also provides a bracket structure. The bracket structure includes a first housing 110 and a second housing 120. When assembling the bracket structure, the first housing seat 310 is fixedly connected to the first housing 110, and the second housing seat 320 is fixedly connected to the second housing 120. During the unfolding and folding process of the bracket structure, the first housing 110 and the second housing 120 can respectively drive the first housing seat 310 and the second housing seat 320 to move relatively, so that the first housing seat 310 and the second housing seat 320 can move relative to each other.

In some embodiments, the first housing seat 310 and the first housing 110 may be fixed to each other by means of bonding, riveting, clamping or screwing. In order to improve connection reliability and reduce the difficulty of disassembly, a through hole or a threaded hole can be formed on the first housing seat 310 and the first housing 110, so that the spacing between the first housing seat 310 and the first housing 110 are fixedly connected through threaded connectors. Correspondingly, the second housing seat 320 and the second housing 120 may also be fixed to each other through threaded connectors.

In addition, as mentioned above, the first screen support plate 210 and the first housing seat 310 can rotate relative to each other. Therefore, in order to avoid that the first housing 110 and the first housing seat 310 blocks the rotation of the first screen support plate 210, a side of the first housing 110 and a side of the first housing seat 310 facing the first screen support plate 210 are provided with an inclined avoidance support surface. In this case, on the one hand, the first screen support plate 210 has the ability to rotate relative to the first housing seat 310 (and the first housing 110). On the other hand, the inclined avoidance support surface can also provide a better support effect for the first screen support surface, thereby ensuring that the flexible display screen can be well supported.

Correspondingly, the side of the second housing 120 and the side of the second housing seat 320 facing the second screen support plate 220 can also be provided with an inclined avoidance support surface, so that in the folded state, the first screen support plate 210 and the second screen support plate 220 are respectively supported on the corresponding inclined avoidance support surfaces, so as to improve the operation stability of the foldable mechanism.

As mentioned above, the first housing seat 310 and the first screen support plate 210 are rotatably fitted, and correspondingly, the second housing seat 320 and the second screen support plate 220 are rotatably fitted. As mentioned above, the first housing seat 310 and the second housing seat 320 can be arranged symmetrically, and the first screen support plate 210 and the second screen support plate 220 can also be arranged symmetrically. For conciseness, the first screen support plate 210 and the first housing seat 310 are taken as examples to describe the connection relationship between the screen support plate and the housing seat. Correspondingly, for the fitting relationship between the second screen support plate 220 and the second housing seat 320, reference can also be correspondingly made.

In some embodiments, the first screen support plate 210 may be rotatably connected to the first housing 110 in the bracket structure, and as described above, the first housing seat 310 is fixedly connected to the first housing 110. In this case, the first screen support plate 210 can form a rotational fit relationship with the first housing seat 310. To facilitate installation, as shown in FIG. 1, the foldable mechanism may include a rotating part, and the first screen support plate 210 may be rotatably connected to the first housing 110 through the rotating part.

As shown in FIG. 1, the rotating part includes a third rotating part and a fourth rotating part 520, one of the third rotating part and the fourth rotating part 520 is connected to the first housing 110, and the other is connected to the first screen support plate 210. The third rotating part includes an inserting block, and the fourth rotating part 520 is provided with an inserting slot. The inserting block and the inserting slot are both equipped with arc-shaped mating surfaces, and the inserting block and the inserting slot are rotatably fitted through the arc-shaped mating surface, to ensure a large rotational mating area between the third rotating part and the fourth rotating part 520, improving the reliability of the rotational connection relationship between the two. Moreover, in the case of adopting the above technical solution, by arranging the third rotating part and the fourth rotating part 520 on the second side of the first screen support plate 210, this can ensure that while the rotating part is positioned on a side of the first screen support plate 210 facing the first housing 110, the distance between the first screen support plate 210 and the first housing 110 is smaller, further reducing the space occupied by the entire bracket structure in the thickness direction of the base 410.

In some embodiments, by adapting the shape and size of the inserting block and the inserting slot, this can ensure that a rotational fit relationship can be formed between the two. Moreover, the inserting slot can be a structure with openings on both sides, so that the inserting block can be installed into the inserting slot from one side of the inserting slot, and the maximum relative rotation angle between the inserting block and the inserting slot can be limited by means of structures such as the first housing 110. In addition, by providing detachable limiting structures at two opposite ends of the first screen support plate 210 along the rotational axis of the second rotating part 302, the relative positional relationship of the first screen support plate 210 and the first housing 110 can be fixed in the rotational axis of the second rotation part 302, to prevent relative movement of the two in the direction.

In some embodiments, there are a plurality of rotating parts. In the case that there are both a plurality of third rotating parts and fourth rotating parts 520, the plurality of third rotating parts are fitted with the plurality of fourth rotating parts 520 in one-to-one correspondence. Under the action of a plurality of rotating components, on the one hand, the stability of the rotation fit between the first screen support plate 210 and the first housing 110 can be improved. On the other hand, this can also expand the optional type of the structure of the rotating component and reduce the difficulty of design and processing, and the relative position relationship between the first screen support plate 210 and the first housing 110 in the rotational axis of the second rotating part 302 can be limited with the help of the plurality of third rotating parts and fourth rotating parts 520 that are fitted with each other. In some embodiments, the structures of the third rotating parts may be the same, and correspondingly, the structures of the fourth rotating parts 520 may also be the same, which can reduce the processing difficulty to a certain extent.

Based on the bracket structure provided in the above embodiments, further, the embodiment of the present application further provides an electronic device. The electronic device includes a first display module 610 and the above bracket structure, where the first display module 610 includes a flexible display screen, the first display module 610 is installed on the bracket structure, and the first display module 610 can be supported on the first housing 110, the second housing 120, the first screen support plate 210 and the second screen support plate 220, ensuring that the bracket structure can provide a better supporting effect for the flexible display screen in the first display module 610. Moreover, the electronic device has a folded state and an unfolded state. In the folded state, the spacing between the respective first sides 203 of the first screen support plate 210 and the second screen support plate 220 is greater than a spacing between the respective second sides of the first screen support plate 210 and the second screen support plate 220, which enables the electronic device to provide a larger and flared accommodation space for the middle part of the first display module 610, and prevents creases in the middle part of the first display module 610 when being folded as much as possible, so as to improve its service life.

In order to further improve the usability of the electronic device, a second display module is provided on a side of the first housing 110 away from the first display module 610, and parameters such as the size of the second display module can be determined according to the actual situation. In the case of adopting the above technical solution, display modules are provided on two opposite sides of the first housing 110. By making the electronic device in a folded state, on the one hand, it is convenient for the user to carry, and the user can use the second display module to perform human-computer interaction; and when the user has needs such as browsing videos, the electronic device can be unfolded to use the first display module 610 with a larger display area, to improve the audio-visual experience. Of course, the above-mentioned scenarios are only for illustration, and the user can also use the first display module 610 and the second display module at the same time if software and other conditions are met. In other words, during the use of the electronic device, the user can flexibly choose to use the first display module 610 and/or the second display module according to their own needs, which is not limited herein.

The electronic device disclosed in embodiments of the present application may be a smart phone, a tablet computer, an e-book reader, or a wearable device. In some embodiments, the electronic device may also be another device. This is not limited in embodiments of the present application.

The foregoing embodiments of the present application focus on describing differences between the embodiments, and different optimization features of the embodiments may be combined to form better embodiments provided that they are not contradictory. For brevity, details are not described herein again.

The foregoing descriptions are merely embodiments of the present application, and are not intended to limit the present application. Various changes and modifications may be made to the present application by a person skilled in the art. Any modifications, equivalent substitutions, improvements, and the like made within the spirit and principle of the present application should be included within the scope of the claims of the present application.

The invention claimed is:

1. A foldable mechanism, comprising a first screen support plate, a second screen support plate, a third screen support plate, a first housing seat, a second housing seat and a base, wherein:

the first housing seat is arranged on the first screen support plate, and the first screen support plate is rotatably matched with the first housing seat;

the second housing seat is arranged on the second screen support plate, and the second screen support plate is rotatably matched with the second housing seat;

the third screen support plate is movably connected to the base along a thickness direction of the third screen support plate, a side of the first screen support plate and a side of the second screen support plate closer to the third screen support plate are each provided with a first bonding edge, two opposite sides of the third screen support plate are each provided with a second bonding edge, wherein the first bonding edge and the second bonding edge are stepped structural members configured to mate with each other;

the base is provided with a plurality of first rotating parts, and the first housing seat and the second housing seat are rotationally connected to the plurality of first rotating parts in a one-to-one correspondence through their respective second rotating parts;

the foldable mechanism has an unfolded state and a folded state, and in the unfolded state, respective first sides of the first screen support plate and the second screen support plate are located between respective second sides of the first screen support plate and the second screen support plate, the third screen support plate is located between the first screen support plate and the second screen support plate, each second bonding edge is in mating engagement with a corresponding first bonding edge, and the first screen support plate, the second screen support plate, and the third screen support plate are arranged in a flush manner away from a first surface of the base; and in the folded state, a spacing between the respective first sides of the first screen support plate and the second screen support plate is greater than that of the respective second sides of the first screen support plate and the second screen support plate.

2. The foldable mechanism according to claim 1, wherein in the unfolded state, a spacing between the third screen support plate and the base along the thickness direction of the third screen support plate is a first spacing; and in the folded state, a spacing between the third screen support plate and the base along the thickness direction of the third screen support plate is a second spacing, and the second spacing is smaller than the first spacing.

3. The foldable mechanism according to claim 2, wherein:

in the unfolded state, the third screen support plate is supported on at least one of the first housing seat or the second housing seat; and in the folded state, the third screen support plate is supported on the base.

4. The foldable mechanism according to claim 1, wherein the foldable mechanism further comprises a first connecting shaft, a second connecting shaft, a first synchronous swing arm, and a second synchronous swing arm, wherein:

the first synchronous swing arm is fitted with the first connecting shaft in a limiting manner in a rotation direction of the second rotating part, and the second synchronous swing arm is fitted with the second connecting shaft in a limiting manner in a rotation direction of the second rotating part; and the first synchronous swing arm is fitted with the first housing seat, the second synchronous swing arm is fitted with the second housing seat, the first synchronous swing arm and the second synchronous swing arm are connected through a gear synchronization mechanism, and the first housing seat and the second housing seat rotate synchronously through a gear synchronization mechanism.

5. The foldable mechanism according to claim 4, wherein the gear synchronization mechanism comprises a first meshing tooth arranged on the first connecting shaft, a second meshing tooth arranged on the second connecting, a first gear, and a second gear, wherein:

the first meshing tooth meshes with the first gear;
the first gear meshes with the second gear; and
the second gear meshes with the second meshing tooth.

6. The foldable mechanism according to claim 4, wherein the foldable mechanism further comprises a first cam sleeve, a second cam sleeve, and an elastic part, wherein:

the first connecting shaft is sleeved with the first cam sleeve and the second cam sleeve;

the first synchronous swing arm is fixed with the first cam sleeve;

the second cam sleeve and the first connecting shaft rotate in fitting with each other in the rotation direction of the second rotating part; and when the first cam sleeve and the second cam sleeve rotate relative to each other, the elastic part is in a stretched state or a compressed state.

7. The foldable mechanism according to claim 6, wherein the foldable mechanism further comprises a mounting part, the mounting part is fixed on the base, the mounting part is provided with a first limiting part and a second limiting part that are opposite and fixed along the rotational axis of the second rotating part, the first cam sleeve, the second cam sleeve and the elastic part are all provided between the first limiting part and the second limiting part, and the elastic part is disposed on a side of the second cam sleeve away from the first cam sleeve.

8. The foldable mechanism according to claim 7, wherein the mounting part is further provided with a third limiting part located between the first limiting part and the second limiting part, and the first cam sleeve, the second cam sleeve and the elastic part are provided both between the first limiting part and the third limiting part and between second limiting part and the third limiting part.

9. The foldable mechanism according to claim 6, wherein both the first synchronous swing arm and the second synchronous swing arm are fixed with the first cam sleeve, and each first cam sleeve is correspondingly equipped with the second cam sleeve and the elastic part.

10. The foldable mechanism according to claim 1, wherein the foldable mechanism further comprises a cover body, the cover body is fixedly connected to a side of the base away from the first screen support plate, and in the folded state, a projection of the cover body on a plane on which distribution directions of the first screen support plate and the second screen support plate and a rotational axis direction of the second rotating part are located covers the third screen support plate, the first housing seat, the second housing seat and the base.

11. The foldable mechanism according to claim 10, wherein the first housing seat or the second housing seat comprises an avoidance structure, the avoidance structure is provided with an avoidance groove, and in the unfolded state, sides of the cover body are accommodated in the avoidance groove.

12. The foldable mechanism according to claim 1, wherein a receiving groove is provided on the base;

the first rotating part, the first housing seat, and the second housing seat are arranged in the receiving groove; and at least a part of the second rotating part of the first housing seat and the second housing seat is accommodated in the receiving groove.

13. The foldable mechanism according to claim 12, wherein one of the first rotating part and the second rotating part comprises a slider, the other is provided with a slide groove, and the slide groove and the slider are slidably fitted.

14. The foldable mechanism according to claim 13, wherein the first rotating part is provided on two opposite sides of the receiving groove, and two opposite sides of the first housing seat and the second housing seat are provided with the second rotating part.

15. The foldable mechanism according to claim 1, wherein on the rotational axis direction of the second rotating part, a plurality of first rotating parts are arranged at intervals or in a staggered manner.

16. The foldable mechanism according to claim 1, wherein there are a plurality of first housing seats or a plurality of second housing seats.

17. A bracket structure, comprising a first housing, a second housing, and a foldable mechanism, wherein the foldable mechanism comprises a first screen support plate, a second screen support plate, a third screen support plate, a first housing seat, a second housing seat and a base, wherein:

the first housing seat is arranged on the first screen support plate, and the first screen support plate is rotatably matched with the first housing seat;

the second housing seat is arranged on the second screen support plate, and the second screen support plate is rotatably matched with the second housing seat;

the third screen support plate is movably connected to the base along a thickness direction of the third screen support plate, a side of the first screen support plate and a side of the second screen support plate closer to the third screen support plate are each provided with a first bonding edge, two opposite sides of the third screen support plate are each provided with a second bonding edge, wherein the first bonding edge and the second bonding edge are stepped structural members configured to mate with each other;

the base is provided with a plurality of first rotating parts, and the first housing seat and the second housing seat are rotationally connected to the plurality of first rotating parts in a one-to-one correspondence through their respective second rotating parts;

the foldable mechanism has an unfolded state and a folded state, and in the unfolded state, respective first sides of the first screen support plate and the second screen support plate are located between respective second sides of the first screen support plate and the second screen support plate, the third screen support plate is located between the first screen support plate and the second screen support plate, each second bonding edge is in mating engagement with a corresponding first bonding edge, and the first screen support plate, the second screen support plate, and the third screen support plate are arranged in a flush manner away from a first surface of the base; and in the folded state, a spacing between the respective first sides of the first screen support plate and the second screen support plate is greater than that of the respective second sides of the first screen support plate and the second screen support plate, wherein:

the first housing seat is fixedly connected to the first housing, and a side of the first housing and a side of the first housing seat facing the first screen support plate are both provided with an inclined avoidance support surface;

the second housing seat is fixedly connected to the second housing, and a side of the second housing and a side of the second housing seat facing the second screen support plate are both provided with an inclined avoidance support surface; and in the folded state, the first screen support plate and the second screen support plate are respectively supported on the corresponding inclined avoidance support surfaces.

18. The bracket structure according to claim 17, further comprising a rotating part, wherein:

the first screen support plate is rotatably connected to the first housing through the rotating part; and the rotating part comprises a third rotating part and a fourth rotating part, one of the third rotating part and the fourth rotating part is connected to the first housing, the other one of the third rotating part and the fourth rotating part is connected to the first screen support plate, the third rotating part includes an inserting block, the fourth rotating part is provided with an inserting slot, the inserting block and the inserting slot are both provided with an arc-shaped mating surface, and the inserting block and the inserting slot are rotatably fitted through the arc-shaped mating surface.

19. An electronic device, comprising a first display module and a bracket structure, wherein:

the bracket structure comprises a first housing, a second housing, and a foldable mechanism, wherein the foldable mechanism comprises a first screen support plate, a second screen support plate, a third screen support plate, a first housing seat, a second housing seat and a base, wherein:

the first housing seat is arranged on the first screen support plate, and the first screen support plate is rotatably matched with the first housing seat;

the second housing seat is arranged on the second screen support plate, and the second screen support plate is rotatably matched with the second housing seat;

the third screen support plate is movably connected to the base along a thickness direction of the third screen support plate, a side of the first screen support plate and a side of the second screen support plate closer to the third screen support plate are each provided with a first bonding edge, two opposite sides of the third screen support plate are each provided with a second bonding edge, wherein the first bonding edge and the second bonding edge are stepped structural members configured to mate with each other;

the base is provided with a plurality of first rotating parts, and the first housing seat and the second housing seat are rotationally connected to the plurality of first rotating parts in a one-to-one correspondence through their respective second rotating parts;

the foldable mechanism has an unfolded state and a folded state, and in the unfolded state, respective first sides of the first screen support plate and the second screen support plate are located between respective second sides of the first screen support plate and the second screen support plate, the third screen support plate is located between the first screen support plate and the second screen support plate, each second bonding edge is in mating engagement with a corresponding first bonding edge, and the first screen support plate, the second screen support plate, and the third screen support plate are arranged in a flush manner away from a first surface of the base; and in the folded state, a spacing between the respective first sides of the first screen support plate and the second screen support plate is greater than that of the respective second sides of the first screen support plate and the second screen support plate; and the first display module comprises a flexible display screen, the first display module is arranged on the bracket structure, and the first display module is supported by the first housing, the second housing, the first screen support plate, the second screen support plate, and the third screen support plate.

* * * * *